Figure 1:
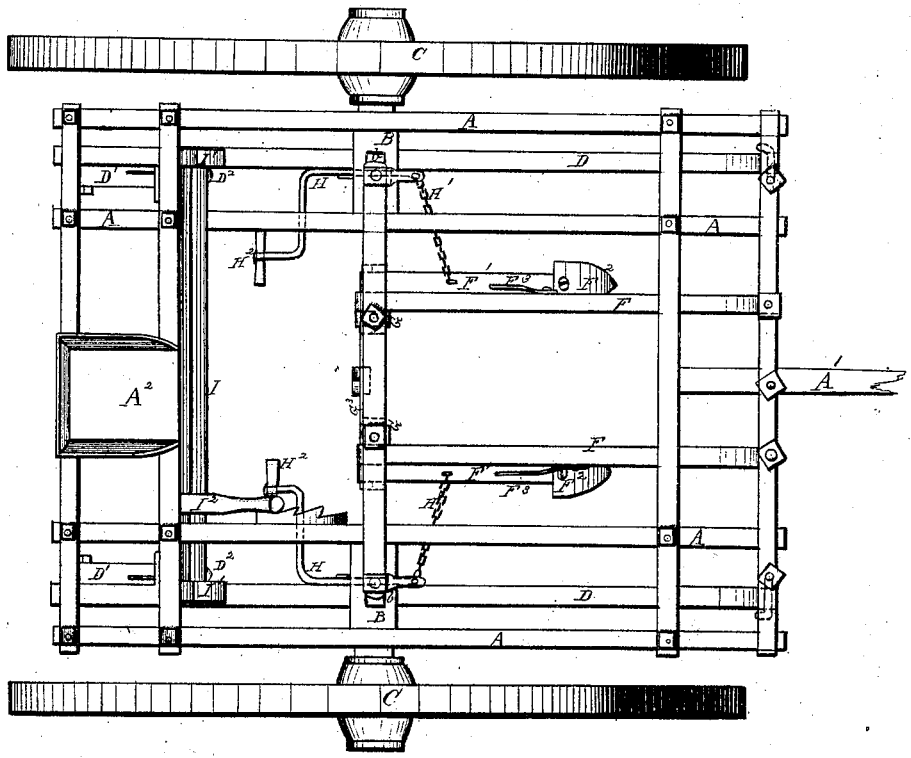

2 Sheets—Sheet 1.

C. BIRD.
Cultivator.

No. 101,216. Patented March 29, 1870.

Witnesses

C. Bird
Inventor

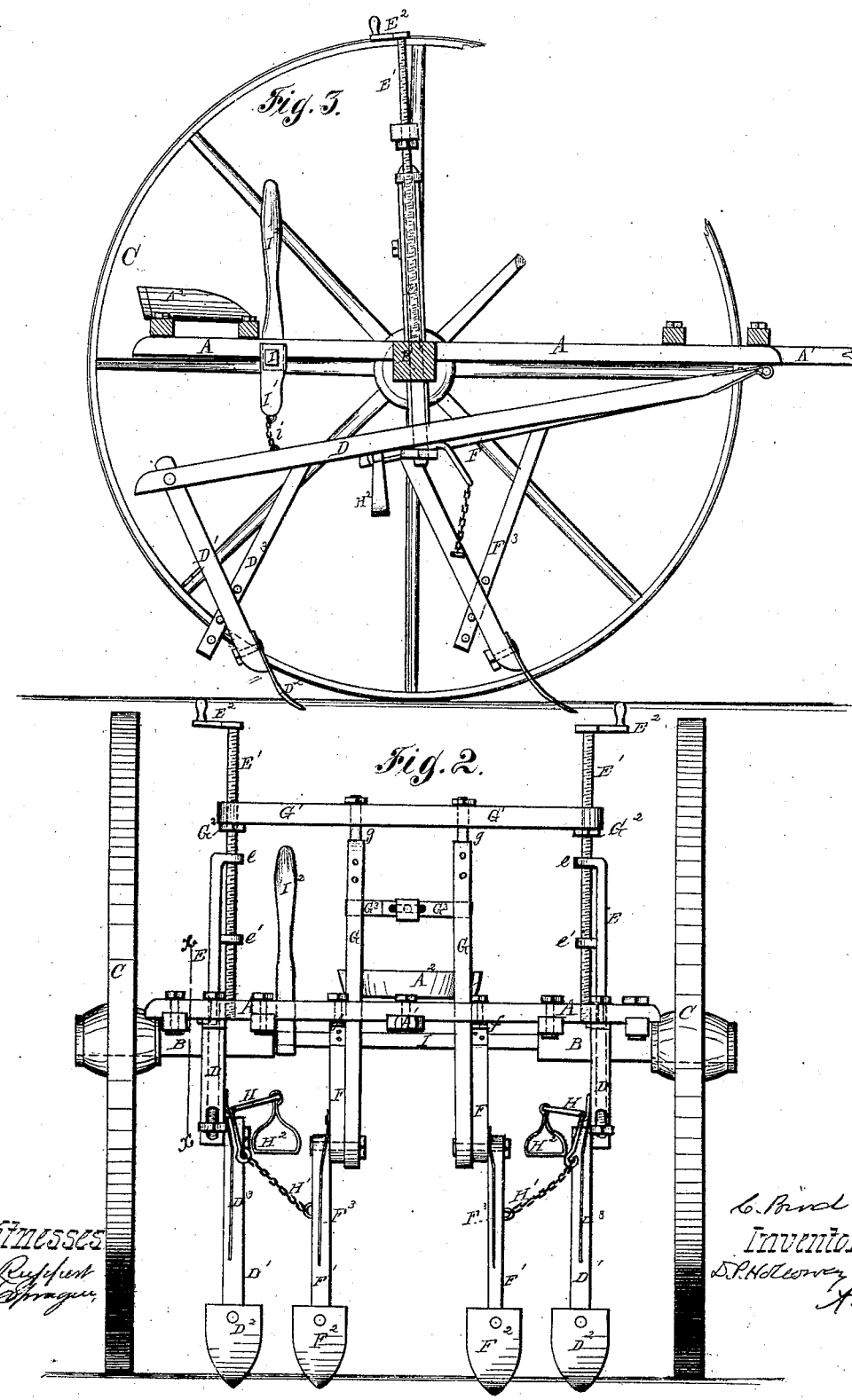

United States Patent Office.

CHARLES BIRD, OF ACKLEY, IOWA.

Letters Patent No. 101,216, dated March 29, 1870.

IMPROVEMENT IN CULTIVATORS.

The Schedule referred to in these Letters Patent and making part of the same

*To all whom it may concern:*

Be it known that I, CHARLES BIRD, of Ackley, in the county of Hardin, and State of Iowa, have invented new and useful Improvements in Cultivators; and I do hereby declare that the following is a full, clear, and exact description thereof, reference being had to the annexed drawings making part of this specification, in which—

Figure 1 is a plan view.
Figure 2 is a front elevation.
Figure 3 is a vertical longitudinal section on line $x$ $x$ of fig. 2.

The same letters are used in all the figures to designate identical parts.

My invention relates to cultivators for plowing among growing crops of corn and other grain planted in rows.

My improvements consist in the combination and arrangement of some of the parts pertaining to such a machine, as will be more fully described hereinafter.

To enable those skilled in the art to make and use my invention, I will proceed to describe its construction and operation.

The frame of the machine, marked A in the drawings, is made of a rectangular form, consisting of two longitudinal beams upon each side, bolted to two transverse beams upon each end, as clearly shown in fig. 1.

To the front cross-beams the tongue A' is fastened in the usual manner, and upon the rear cross-beams the seat A² is mounted, upon which the driver sits in operating the machine.

At the proper points the axles B B are fastened to the frame opposite each other, and journaled in the hubs of the carrying-wheels C C, upon which the whole machine is mounted. These axles extend inward to the inner longitudinal beams only, so as to leave a large open space in the frame to allow of the free movement of the inner plows.

D D are two plow-beams, the forward ends of which are pivoted to the front cross-beam of the frame, equidistant from the center line, and in as close proximity to the wheels as may be found practicable.

Each of these beams carries a standard, $D^1$, upon its rear end, provided with a shovel, $D^2$. The standards, being pivoted to the beams, are held in the proper position by the bars $D^3$ $D^3$, which are hinged at one end to the beams forward of the standards, and connected at the other end to such standards by bolts or in any other approved manner.

E E represent two vertical bars of iron passing through holes $b$ $b$ in the axles B B, and secured at their lower ends to the plow-beams D D.

These bars rise to a suitable height above the axles, and are provided with lugs $e$ $e$ upon their opposing sides, in which lugs holes are bored vertically, one above the other, and in these holes screw-threads are formed to receive the screw-spindles $E^1$ $E^1$.

The bars E, which may be made square to prevent their turning, play freely up and down in the apertures in the axles, so that, by screwing them up or down on the screw-spindles $E^1$, which is done by turning such spindles by cranks $E^2$ upon their upper ends, the depth at which the shovels $D^2$ shall enter the ground can be regulated, it being understood that these plows are supported by such screw-spindles $E^2$, resting upon the axles.

F F are the two short inner plow-beams, carrying standards $F^1$ $F^1$ upon their rear ends, said standards being provided with shovels $F^2$ $F^2$, and held in position by bars $F^3$ $F^3$ in the same manner as the standards $D^1$, above described.

These plows are pivoted, at their forward ends, to the front cross-beam of the frame by universal joints $f$ $f$, and constitute, together with the plows D D, two double-shovel plows, which cultivate a row of corn or other crop upon both sides at the same time.

To accommodate the inner plows F to the sinuosity and width of the rows, they are hung upon their rear ends to pendants, in such a manner as to be capable of lateral movement and of being placed nearer to or farther from each other.

G G represent these pendants or swinging beams, to the lower ends of which the plows F F are pivoted.

At their upper extremities they are hung to swiveling bolts $g$ $g$, secured in the cross-head $G^1$. This cross-head spans the two screw-spindles $E^1$ $E^1$, on which it is placed, sliding freely up and down on the same. Its position thereon is regulated by the nuts $G^2$ $G^2$, so that the shovels $F^2$ may be made to enter the ground any desirable depth independent of the shovels $D^2$.

For the purpose of regulating the distance between the inner plows F F, the swinging beams G are provided with projecting arms $G^3$ $G^3$, opposite and overlapping each other, as shown in fig. 2, and having slots in such overlapping portions, through which the bolt passes for securing these arms to each other. To change the distance between these inner plows, it is only necessary to loosen this bolt and lengthen or shorten the lap of the arms $G^3$.

By the above-described arrangement of the inner plows, it will be seen that they can be moved laterally as the crookedness of the rows may make it necessary. This movement is given to them and regulated by the feet of the driver through the following mechanism:

H H represent two short horizontal shafts, hung respectively to the inner sides of the plow-beams D D. They are cranked at each end, such cranks sustaining about the position relatively to each other as shown in fig. 2.

The forward cranks are connected, by chains $H^1$ $H^1$, to the plow-standards $F^3$ $F^3$, and to the rear cranks are hung the stirrup-irons H² H², in which the feet of the operator rest. Thus, by bearing down upon one or the other of these stirrup-irons, the plows can be moved laterally with little exertion.

I is a transverse rock-shaft, having its bearings in boxes secured to the frame. Its ends project a short distance through such boxes, and are here provided with cranks I¹ I¹, directly above the plow-beams D D, to which such cranks are connected by chains $i$ $i$.

The rock-shaft lays in close proximity to the seat, and is provided with a hand-lever, I², by which it can be turned so as to raise all the plows above the ground.

What I claim as new, and desire to secure by Letters Patent, is—

1. The combination of the plows D, bars E, and screw-spindles E¹, cross-head G¹, all arranged to operate substantially as and for the purpose set forth.

2. The combination of the plows F, swinging beams G, cross-head G¹, nuts G², and screw-spindles E¹, all arranged to operate substantially as and for the purpose set forth.

In testimony whereof I have signed my name to this specification in the presence of two subscribing witnesses.

CHARLES BIRD.

Witnesses:
B. EDW. J. EILS,
A. RUPPERT.